(12) United States Patent
Szczepanik et al.

(10) Patent No.: US 11,695,552 B2
(45) Date of Patent: Jul. 4, 2023

(54) QUANTUM KEY DISTRIBUTION IN A MULTI-CLOUD ENVIRONMENT

(71) Applicant: International Business Machines Corporation, Armonk, NY (US)

(72) Inventors: Grzegorz Piotr Szczepanik, Cracow (PL); Kushal S. Patel, Pune (IN); Lukasz Jakub Palus, Cracow (PL); Sarvesh S. Patel, Pune (IN)

(73) Assignee: International Business Machines Corporation, Armonk, NY (US)

(*) Notice: Subject to any disclaimer, the term of this patent is extended or adjusted under 35 U.S.C. 154(b) by 209 days.

(21) Appl. No.: 17/212,031

(22) Filed: Mar. 25, 2021

(65) Prior Publication Data
US 2022/0311603 A1  Sep. 29, 2022

(51) Int. Cl.
*G06F 12/14* (2006.01)
*H04L 9/08* (2006.01)
(Continued)

(52) U.S. Cl.
CPC ........ *H04L 9/0858* (2013.01); *G06F 11/1004* (2013.01); *G06N 10/00* (2019.01); *H04L 9/14* (2013.01)

(58) Field of Classification Search
USPC ........................................................ 713/193
See application file for complete search history.

(56) References Cited

U.S. PATENT DOCUMENTS 7,385,942 B2   6/2008  Brady
9,214,957 B2  12/2015  Bender
(Continued)

FOREIGN PATENT DOCUMENTS

CA   2938758 A1   2/2017
CN   105871538 B   8/2016
(Continued)

OTHER PUBLICATIONS

Alhussen Ahmed et al: "RIVAChain: Blockchain-based Integrity Verification for File Transfers", 2020 IEEE International Conference on Big Data (Big Data), IEEE, Dec. 10, 2020 (Dec. 10, 2020), pp. 3255-3261 (Year: 2020).*

(Continued)

*Primary Examiner* — Sanchit K Sarker
(74) *Attorney, Agent, or Firm* — Joseph P. Curcuru

(57) ABSTRACT

In an approach to improve the field of multi-cloud environments by detecting data corruption between storage systems. Embodiments perform information tunneling on data transferring between a source storage system and a target storage system. Further, embodiments determine a checksum data of a data payload does not match an Internet Protocol (IP) packet extracted checksum and a blockchain based checksum and compare the checksum data at the target storage system with the IP packet extracted checksum and the blockchain based checksum to identify one or more checksum mismatches. Additionally, embodiments identify a corruption in a data payload based on the comparison between the checksum data at the target storage system and the IP packet extracted checksum and the blockchain based checksum, validate the corruption in the data payload, and update respective entities of identified corruption in the data payload.

20 Claims, 8 Drawing Sheets

(51) Int. Cl.
   *G06N 10/00* (2022.01)
   *G06F 11/10* (2006.01)
   *H04L 9/14* (2006.01)

(56) References Cited

U.S. PATENT DOCUMENTS

| | | | |
|---|---|---|---|
| 9,698,979 | B2 | 7/2017 | Armstrong |
| 10,491,383 | B2 | 11/2019 | Fu |
| 2012/0254519 | A1* | 10/2012 | Ellis .................. G06F 12/0246 |
| | | | 711/E12.008 |
| 2016/0283920 | A1 | 9/2016 | Fisher |
| 2018/0217898 | A1* | 8/2018 | Tormasov .............. G06Q 20/42 |
| 2018/0302417 | A1 | 10/2018 | Wilson |
| 2019/0058709 | A1* | 2/2019 | Kempf ................ H04L 63/0876 |
| 2019/0155801 | A1 | 5/2019 | Karunanithi |

FOREIGN PATENT DOCUMENTS

| | | | |
|---|---|---|---|
| CN | 112187448 | A * | 1/2021 |
| JP | 5338665 | B2 | 11/2013 |
| RU | 2739135 | C1 | 12/2020 |
| WO | 2016029119 | A1 | 2/2016 |

OTHER PUBLICATIONS

"Blockchain", Blockchain Technology and Applications | Microsoft Azure, <https://azure.microsoft.com/en-in/solutions/blockchain/>, Dec. 18, 2020, 20 pages.

"Chapter 6 Encryption, Tunneling, and Virtual Private Networks", Oracle, Copyright 2010, <https://docs.oracle.com/cd/E19047-01/sunscreen32/806-6347/6jfa0g87l/index.html>, 11 pages.

"Quantum key distribution", Wikipedia, <https://en.wikipedia.org/wiki/Quantum_key_distribution>, edited on Nov. 18, 2020, 23 pages.

"Securing MQTT Systems—MQTT Security Fundamentals", The HiveMQ Team, Jun. 1, 2015, <https://www.hivemq.com/blog/mqtt-security-fundamentals-payload-encryption/>, 11 pages.

Kumar etal., "An Effective Non-Commutative Encryption Approach with Optimized Genetic Algorithm for Ensuring Data Protection in Cloud Computing", Computer Modeling in Engineering & Sciences, Tech Science Press, vol. 125, No. 2, 2020, <https://www.techscience.com/CMES/v125n2/40313>, 27 pages.

Mell et al., "The NIST Definition of Cloud Computing", NIST, National Institute of Standards and Technology, Special Publication 800-145, Sep. 2011, 7 pages.

Murali et al., "CloudQKDP: Quantum Key Distribution Protocol for Cloud Computing", International Conference On Information Communication And Embedded System(ICICES 2016), <https://ieeexplore.ieee.org/document/7518922>, 6 pages.

Olanrewaju et al., "Cryptography as a Service (CaaS): Quantum Cryptography for Secure Cloud Computing", Indian Journal of Science and Technology, vol. 10(7), DOI: 10.17485/ijst/2017/v10i7/110897, Feb. 2017, 7 pages.

Singh et al., "Data Privacy Protection Mechanisms in Cloud", Data Sci. Eng. (2018) 3:24-39, <https://link.springer.com/article/10.1007/s41019-017-0046-0>, Published online: Nov. 25, 2017, 16 pages.

Sureshkumar et al., "The Quantum Key Distribution(Qkd) Based Security Enhanced Cloud Data Center Connectivity", International Journal of Latest Trends in Engineering and Technology vol. (7)Issue(4), pp. 378-382.

Alhussen, et al., "RIVAChain: Blockchain-based Integrity Verification for File Transfers", 2020 IEEE International Conference on Big Data (Big Data), Dec. 10-13, 2020 , pp. 3255-3261, <https://ieeexplore.ieee.org/document/9378235>.

International Search Report and Written Opinion, International Application No. PCT/EP2022/057716, dated Jun. 20, 2022, 14 pages.

Szczepanik, et al., "Quantum Key Distribution in a Multi-Cloud Environment", International Search Report and Written Opinion, International Application No. PCT/EP2022/057716, International Filing Date Mar. 23, 2022, 44 pages.

\* cited by examiner

QUANTUM KEY DISTRIBUTION IN A MULTI-CLOUD ENVIRONMENT

BACKGROUND OF THE INVENTION

The present invention relates generally to the field of multi-cloud environments, and more particularly to blockchain enabled secured quantum key distribution (QKD) block data movement in storage clouds.

Technology is emerging toward the Quantum Computing era, wherein Quantum mechanics is used in various computing environments. One of the technologies gaining popularity is Quantum Key Distribution (QKD) which is a secure communication mechanism that is used as a cryptographic key sharing platform using quantum mechanics. Generally, QKD generates a shared random secret key known only to the secured parties that may then be used to encrypt and decrypt messages. This mechanism generates a secure key using Photon transmission and sends the generated secure key to the endpoints. As a stream of Photons are transmitted and identical keys are generated at one or more end devices. It is also noted that QKD uses symmetric key encryption. A unique property of QKD is the ability for two or more communicating users to detect the presence of any third party attempting to gain knowledge of the key. The third-party detection is a result of a fundamental aspect of quantum mechanics: the process of measuring a quantum system in general disturbs the system. Therefore, a third party attempting to eavesdrop on the key must in some way measure the quantum system, thus introducing detectable anomalies. By using quantum superpositions or quantum entanglement and transmitting information in quantum states, a communication system may be implemented that detects eavesdropping. If the level of eavesdropping is below a certain threshold, a key maybe produced that is guaranteed to be secure (i.e., the eavesdropper contains no information about it). Thus, enabling a secured mechanism to generate a symmetric key across the end-devices that provides capability of symmetric key encryption across the cloud components. Additionally, modern cloud storage systems use asymmetric key encryption because of the secure key sending limitations.

SUMMARY

Embodiments of the present invention disclose a method, a computer program product, apparatus, and a system for detecting data corruption between storage systems, the computer-implemented method comprising: perform information tunneling on data transferring between a source storage system and a target storage system. Further, embodiments determine a checksum data of a data payload does not match an Internet Protocol (IP) packet extracted checksum and a blockchain based checksum and compare the checksum data at the target storage system with the IP packet extracted checksum and the blockchain based checksum to identify one or more checksum mismatches. Additionally, embodiments identify a corruption in a data payload based on the comparison between the checksum data at the target storage system and the IP packet extracted checksum and the blockchain based checksum. Lastly, responsive to receiving a predetermined number of checksum mismatches that trigger a security breach isolation demanding corrective actions, validating the corruption in the data payload; update respective entities of identified corruption in the data payload.

DETAILED DESCRIPTION

Figure 1:
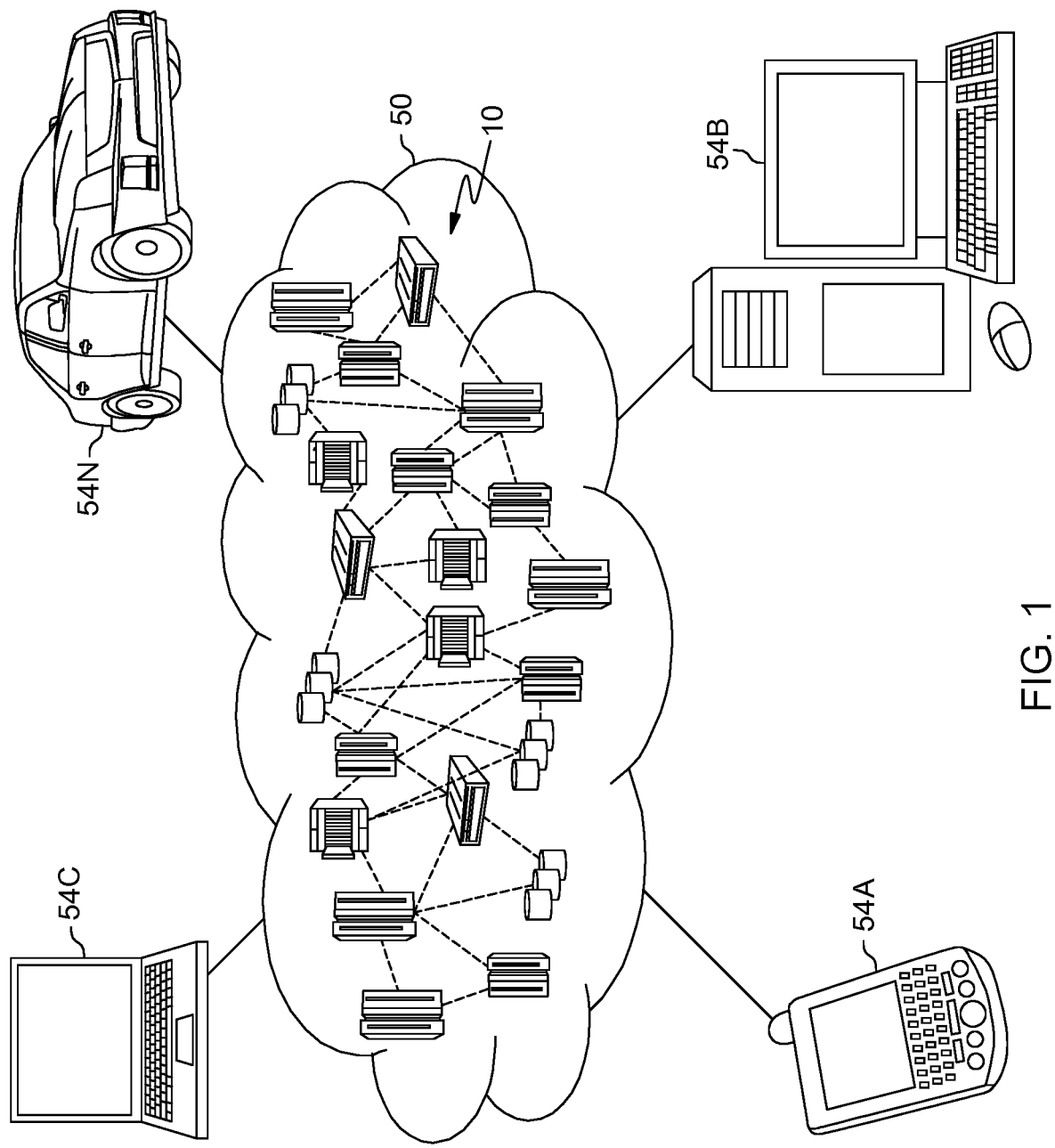
FIG. 1 depicts a cloud computing environment according to an embodiment of the present invention.

Embodiments of the present invention recognize that there are flaws when using symmetric key encryption in cloud storage systems. One problem, that embodiments of the present invention recognize, is that symmetric key encryption cannot be directly used in secured block storage migration because of cloud infrastructure orchestration and Ethernet routing.

In one example, consider storage virtualization engines deployed on different cloud systems (e.g., a first cloud system and a second cloud system) that are catering host application input/outputs (I/O's) being delivered to the storage systems and replicating the host application I/O's to the secondary storage cluster within the second cloud system. In this example, when an I/O is received by the primary storage virtualization engine cluster, the I/O is replicated to the second database cluster (which may be located on the same cloud or a different cloud system) to provide data availability during disaster recovery and failure of any of the storage systems. In this case, when in-flight data encryption is used, in today's art, asymmetric key encryption is executed, wherein asymmetric key encryption comprises public-private key pairs and data encryption prior to transmission over a network. When encrypted data packets reach the designation location, the encrypted data packets are decrypted using asymmetric methods and the plaintext packet payload is processed further and saved to the persistent block storage devices. These persistent block storage devices are connected as backend controllers to the virtualization engine.

In one example, if the QKD mechanism is available between a source and target storage system location, then the QKD mechanism guarantees secure transmission of the key among the locations. This enables symmetric key encryption which is more efficient and takes comparatively less central procession unit (CPU) computing power. In this example, when symmetric key encryption is used across the cloud situated storage engines, there is a potential security threat where the storage system uses transport mode cryptography. In the transport mode security, the data payload is encoded, wherein the routing is intact, since the Internet Protocol (IP)

header is neither modified nor encrypted. In the cloud environment of the storage controller systems, the routing is intact to support underlying cloud orchestration migration and transparency mechanisms. Therefore, embodiments of the present invention recognize that the transport mode encryption is recommended in the cloud instances of storage systems which has the flaw in the IP header. Embodiments of the present invention recognize that the IP headers are not encrypted and comprises the potential threat of changing the encrypted block data payload and changing the IP header for cyclic redundancy check (CRC) and checksum values for the changed (corrupted) payload. In this scenario, once the payload is corrupted and checksum is updated suitably, embodiments of the present invention recognize that there is no known way to detect this type of data corruption.

Additionally, embodiments of the present invention recognize that corrupted data will be saved to the target location, which may lead to several issues. Further, embodiments of the present invention recognize that there are well known techniques that may corrupt the IP payload and update the IP packets for CRC and checksum values that cause block data corruption in the storage replication. Embodiments of the present invention recognize that the problems, outlined above, exist when the symmetric key encryption is used between the storage system instances in the cloud. For example, two storage controllers are situated in different clouds and replication is configured between the two storage instances across the different clouds. As the symmetric key encryption is used with transport mode, the payload is encrypted using the same key that will be used to decrypt the data. When the IP packet is corrupted and header is updated accordingly, resulting in no way to detect the data corruption.

Further, embodiments of the present invention recognize there is currently no way to detect the block based in-flight data corruption in asymmetric key encryption and actions taken on such data corruption in the storage environment. Embodiments of the present invention recognize that the adoption of symmetric key cryptography is very less because of unavailability of the infrastructure for secure key transmission. Embodiments of the present invention recognize that the particular problems stated above are currently difficult to detect which is an issue in the art because future requirements of emerging cloud technology will require symmetric key transmission. Embodiments of the present invention recognize that emerging technology, with the enablement of QKD mechanism in the cloud storage, the storage engine instances in the cloud, as described above, will start adopting the symmetric key cryptography because of its comparatively less CPU cycles. Embodiments of the present invention improve the current art by detecting the data corruption in transport mode encryption of block storage of ethernet based cloud systems.

Embodiments of the present invention work on top of QKD based key distribution for cross-cloud data encryption. Embodiments of the present invention provide mechanism for QKD and enablement in the cloud infrastructure. Embodiments of the present invention, via QKD, improve the art by enabling cloud storage systems to use symmetric key encryption which is less CPU intensive and adds performance benefits to the storage system. Embodiments of the present invention provide a method, system and apparatus to solve the problems stated above by working within prevailing cloud situated storage virtualization systems and providing an efficient way to protect the data from corruption during the replication across the cloud's storage engines.

Embodiments of the present invention solve the problems stated above and improve the art by (i) detecting data corruption across the cloud storage sites during replication and avoids data loss; (ii) performing cost critical data protection that comprises modern robust techniques of blockchain and makes the cloud story stronger; (iii) enabling the usage of symmetric key encryption across the block storage system deployed in the cloud infrastructure; (iv) supporting symmetric key encryption using a QKD mechanism in the storage system that improves encryption performance of the system; (v) providing enhanced security for the Transport mode encryption that enables cloud-based data encryption using cloud; (vi) preventing/avoiding data corruption during transport mode secured IO traffic across the block storage systems; (vii) operating at a reduced cost; and (viii) dynamically adjusting the operations at various levels which optimizes system performance.

Implementation of embodiments of the invention may take a variety of forms, and exemplary implementation details are discussed subsequently with reference to the Figures (i.e., FIG. 1-FIG. 7).

The descriptions of the various embodiments of the present invention have been presented for purposes of illustration but are not intended to be exhaustive or limited to the embodiments disclosed. Many modifications and variations maybe apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to Figure (FIG.) 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
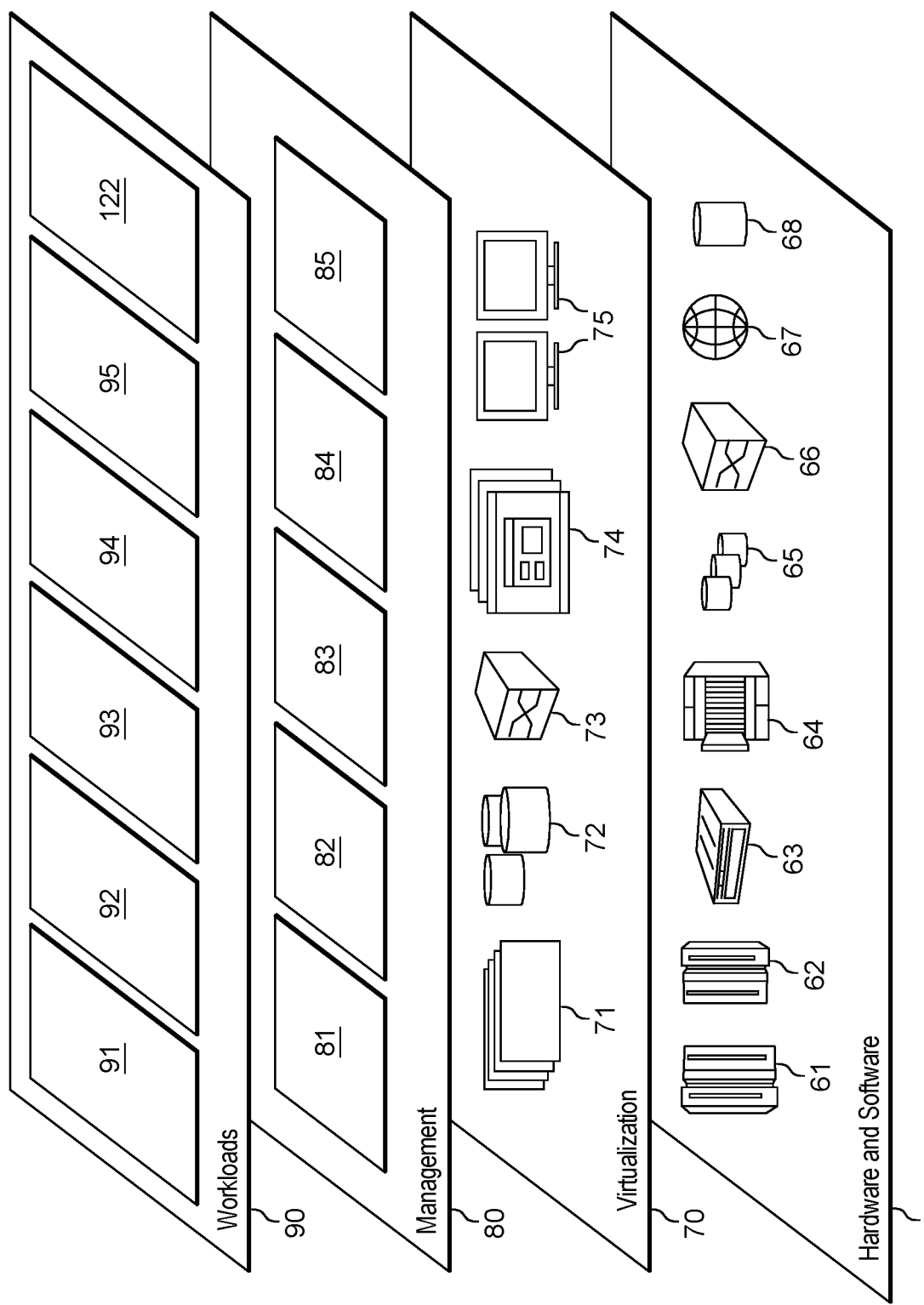
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68 which can be an identity management application (e.g., VMM). It should be noted that the term "database software 68" can herein be used interchangeably with "identity management application 68".

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and data corruption detection component (component) 122.

Figure 3:
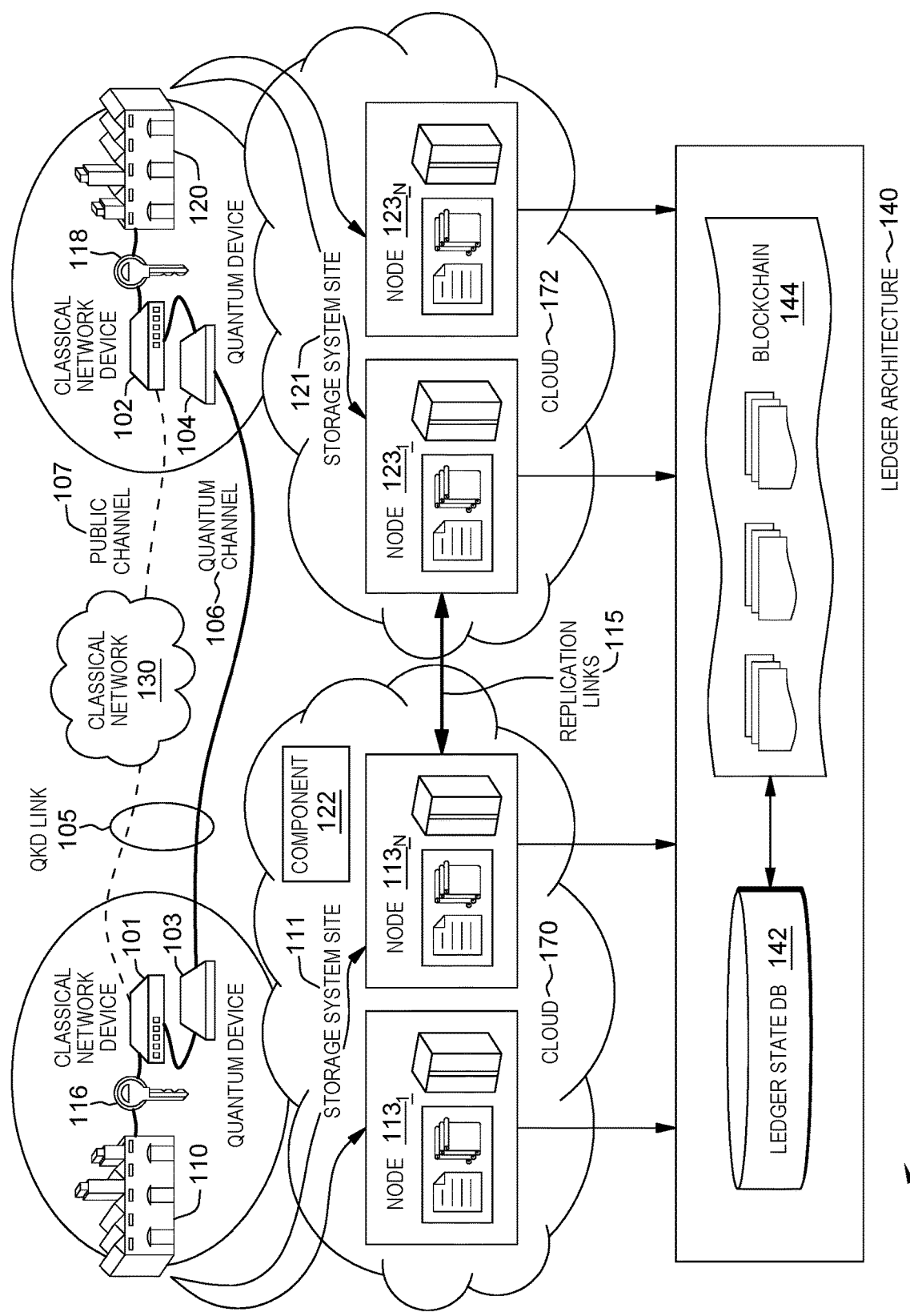
FIG. 3 is a functional block diagram illustrating a distributed data processing environment, in accordance with an embodiment of the present invention.

FIG. 3 is a functional block diagram illustrating a distributed data processing environment, generally designated 300, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 300 includes classical network device (computing device) 101, computing device 102, server computer system (server) 110, and server computer system (server) 120 interconnected over classical network (network) 130 and quantum device 103 and quantum device 104 interconnected over quantum channel 106.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 101, server 120, and server 110, and any other computing devices, server computers, and/or storage devices (not shown in FIG. 3) within distributed data processing environment 300.

Quantum channel 106 is a communication channel that may transmit quantum and classical information. Quantum channel 106, in the depicted embodiment, enables communication between two or more quantum device 103 and quantum device 104, via QKD link 105. QKD link (link) 105 denotes a logical connection between two remote QKD nodes (e.g., quantum device 103 and quantum device 104) connected by a quantum channel (e.g., quantum channel 106) used for transmitting photons and a public channel used for post-processing the exchanged information, respectively. Quantum channel 106 may be any type of quantum channel known and understood in the art, respectively. Quantum device 103 and quantum device 104 enable QKD between server 110 and server 120. In various embodiments of the present invention, quantum device 103 and 104 may each be any quantum as they are known and understood in the art, respectively.

In some embodiments of the present invention, computing device 101 and computing device 102 may each be, but are not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), any HUD known in the art, and/or any programmable electronic computing device capable of communicating with various components and devices within distributed data processing environment 300, via network 130 or any combination therein. In general, computing device 101 and 102 may each be representative of any programmable computing device or a combination of programmable computing devices capable of executing machine-readable program instructions and communicating with users of other computing devices via network 130 and/or capable of executing machine-readable program instructions and communicating with server 120 and/or server 110. In some embodiments computing device 101 and 102 may each represent a plurality of computing devices.

In some embodiments of the present invention, computing device 101 and 102 may each represent any programmable electronic computing device or combination of programmable electronic computing devices capable of executing machine readable program instructions, manipulating executable machine-readable instructions, and communicating with server 120, server 110 and other computing devices (not shown) within distributed data processing environment 300 via a network, such as network 130. Computing device 101 and 102 may each include an instance of a user interface (interface) and one or more local storages. In various embodiments, not depicted in FIG. 3, computing device 101 and 102 may each have a plurality of user interfaces. In other embodiments, not depicted in FIG. 3, distributed data processing environment 300 may comprise a plurality of computing devices, plurality of server computers, and/or one a plurality of networks. Computing device 101 and 102 may each include internal and external hardware components, as depicted, and described in further detail with respect to FIG. 7.

Not depicted in FIG. 1 is the user interface (interface) on computing device 101 and 102, wherein the interface may provide an interface to computing device 101, computing device 102, server 110, server 120, component 122, quantum device 103, quantum device 104, and/or any other user accessible component (e.g., software, webservice, and/or hardware) executing within distributed data processing environment 300. Computing device 101 or 102, via the user interface, may enable a user and/or a client to interact with data corruption detection component (component) 122, server 110, and/or server 120 in various ways, such as sending program instructions, receiving program instructions, sending and/or receiving messages, updating data, sending data, inputting data, editing data, collecting data, and/or receiving data. In one embodiment, the interface may be a graphical user interface (GUI) or a web user interface (WUI) and may display at least text, documents, web browser windows, user options, application interfaces, and instructions for operation. The interface may include data (such as graphic, text, and sound) presented to a user and control sequences the user employs to control operations. In another embodiment, the interface may be a mobile application software providing an interface between a user of computing device 101 or computing device 102 and quantum device 103, quantum device 104, server 110, and/or server 120. Mobile application software, or an "app," may be designed to run on smart phones, tablet computers and other computing devices. In an embodiment, the interface may enable the user of computing device 101 or computing device 102 to at least send data, input data, edit data (annotations), collect data and/or receive data.

Server 110 and server 120 may each be a standalone computing device, a management server, a web server, a mobile computing device, one or more client servers, or any other electronic device or computing system capable of receiving, sending, and processing data. In other embodiments, server 110 and server 120 may each represent a server computing system utilizing multiple computers such as, but not limited to, a server system, such as in a cloud computing environment. In another embodiment, server 110 and server 120 may each represent a computing system utilizing clustered computers and components (e.g., database server computers, application server computers, etc.) that act as a single pool of seamless resources when accessed within distributed data processing environment 300. In various embodiments of the present invention, server 110 and server 120 may be physical or virtual servers and/or any other server known in the art. Server 110 and server 120 may each include internal and external hardware components, as depicted, and described in further detail with respect to FIG. 7. In some embodiments of the present invention, server 110 and server 120 may each represent a plurality of server computers. In various embodiments of the present invention, server 110 and server 120 may each be a system of server computers.

In the depicted embodiment, server 110 comprises storage system 111 represented by cloud 170 and server 120 contains storage system 121 represented by cloud 172. Storage system 111 comprises node $113_{1}$-$_N$, hereinafter node(s) 113. Similarly, storage system 121 comprises node $123_{1}$-$_N$, hereinafter node(s) 123. As used herein, N represents a positive integer, and accordingly the number of scenarios implemented in a given embodiment of the present invention is not limited to those depicted in FIG. 3. Node(s) 113 and 123 may be one or more storage nodes with one or more hard-disk drives (HDDs) or solid-state drives (SDDs). A storage node may also be a virtual machine or virtual logic unit number (LUN) with access to one or more HDDs and/or SSDs. In some embodiments, node(s) 113 and 123 may be one or more virtual storage nodes. In various embodiments, server 110, via node(s) 113 make up cloud 170 and server 120, via node(s) 123, make up cloud 172. Cloud 170 and cloud 172 may be cloud environments capable of cloud storage and/or cloud computing. In various embodiments of the present invention, cloud 170 and cloud 172 may be any cloud environment known in the art.

In the depicted embodiment, node(s) 113 and node(s) 123 communicate with a blockchain ledger architecture (ledger architecture) 140. In various embodiments of the present invention, node(s) 113 and node(s) 123 record transactions (e.g., data transfers or replications) on blockchain 144 and store said transactions onto ledger state database 142. Blockchain 144 is blockchain as it is known and understood in the art. Blockchain 144 provides a secure mechanism to save the data and enable blockchain payload data to be collected at the targeted destination. As the checksum data is saved as part of Blockchain payload, the checksum data cannot be understandably readable and protect against security breach. Ledger state database 142 is a blockchain-based database or any database as it is known and understood in the art. Blockchain 144 may comprise a consensus network (consensus network 160), depicted in FIG. 5A. Consensus network 160 is a fault-tolerant mechanism that is used in computer and blockchain systems to achieve the necessary agreement on a single data value or a single state of the network among distributed processes or multi-agent systems.

Each of node(s) 113 and node(s) 123 may comprise a data/knowledge repository and/or a database that may be written and/or read by one or a combination of component 122, server 110, server 120, computing device 102 and/or computing device 101. Node(s) 113 and node(s) 123 may each comprise an implementation any type of storage device capable of storing data and configuration files that may be accessed and utilized by server 110 and/or server 120, such as, but not limited to, a database server, a hard disk drive, or a flash memory. In some embodiments of the present invention, node(s) 113 and node(s) 123 may comprise may each comprise a hard drive, a memory card, a computer output to laser disc (cold storage), and/or any form of data storage known in the art. In various embodiments, node(s) 113 and node(s) 123 may each access, store, and/or house user data, physical room data, and meeting data, and/or data shared throughout distributed data processing environment 300.

In the depicted embodiment, component 122 executes on storage system 111 within server 110. In other embodiments, component 122 may be executed on storage system 121, computing device 101 or computing device 102. In various embodiments of the present invention, not depicted in FIG. 3, component 122 may execute on a plurality of servers 110, a plurality of servers 120, on a plurality of computing devices 101 and/or a plurality of computing device 102. In some embodiments, component 122 may be located and/or executed anywhere within distributed data processing environment 300 as long as component 122 is connected to and/or communicates with computing device 101, computing device 102, quantum device 103, quantum device 104, server 110, and/or server 120, via network 130.

Component 122 may detect data corruption from source to target cloud instances of a storage system (e.g., storage system 111 and/or storage system 121) and block level I/O replication using a symmetric key encryption mechanism. In various embodiments of the present invention, component 122 generates secure symmetric keys between the source and target system using QKD which may be used for in-flight data replication. For example, storage system 111 (the source system) receives instructions to send data to storage system 121 (the target system). In this example, component 122 generates secure symmetric keys between storage system 111 and storage system 121 to secure the data transaction between storage system 111 and storage system 121. In various embodiments of the present invention, component 122 discovers the physical location of the storage instances in the cloud (e.g., cloud 170 or cloud 172), collects information from the underlying layer of the received quantum keys (e.g. quantum key 116 and quantum key 118) and saves, maintains and encrypts the data using the collected quantum keys.

In various embodiments of the present invention, component 122 encrypts one or more packet payloads in Ethernet packet frames and keeps the routing intact for efficient path traversing of the block data across the cloud 170 and cloud 172. Component 122 may calculate the checksum of the data payload for the internet protocol (IP) packets and requests submission to Blockchain ledger (e.g., blockchain 144) along with the IP packet serial number (ser_no) and checksum. In various embodiments of the present invention, component 122 saves the checksum data as payload on blockchain 144, via ledger state database 142, wherein the saved checksum maybe requested by the target system.

In various embodiments of the present invention, component 122 provides in-bound or out-of-bound application programming interface (API) infrastructure to communicate between the QKD device (e.g., quantum device 103 and quantum device 104) and block storage instances in the cloud based on the physical device identification. Additionally, component 122 may perform information tunneling on data transferring between storage system 111 and storage system 121 using the enabled communication described above, accordingly.

In various embodiments of the present invention, component 122 sends the data to the target location over cloud infrastructure network (e.g., replication links 115) using Quantum key transport mode encrypted packets. Component 122 determines if the checksum data matches the stored IP packet extracted checksum and blockchain based checksum by comparing the checksum data at the target system with the IP packet extracted checksum and blockchain based checksum. If component 122 determines that the checksum data matches IP packet extracted checksum and blockchain based checksum then component 122 decrypts the data payload checksum matches. However, if component 122 determines the checksum data does not match the IP packet extracted checksum and blockchain based checksum the component 122 issues a data SEND_FAILURE and retransmission is initiated as original data is corrupted. In various embodiments of the present invention, component 122 detects and identifies the corruption level of the data and updates the respective entities of the detected and identified data accordingly.

In various embodiments of the present invention, component 122 utilizes pre-existing blockchain payloads to reduce the checksum overload on the blockchain and performance efficiency and deduplication of the checksum over blockchain 144. Component 122 may send the checksum over the blockchain ledger (e.g., blockchain 144) for certain designated objects, set of objects, or inherited objects traversing to improve the selection quality of service data replication. In various embodiments of the present invention, component 122 enables selective secured (e.g., ultra-secured) replication as a service over the cloud (e.g., cloud 170 and/or cloud 172) and configuration parsing before performing the secured checksum validation. In various embodiments of the present invention, component 122 comprises a communications service provider (CSP) interconnection to collet, extract and acknowledge the configuration changes in the subscription of the checksum validator objects. In some embodiments, component 122 enables the new symmetric key and start replication traffic using new key and enable symmetric key encryption based on the collected, extracted, and acknowledged configuration changes, accordingly.

Figure 4:
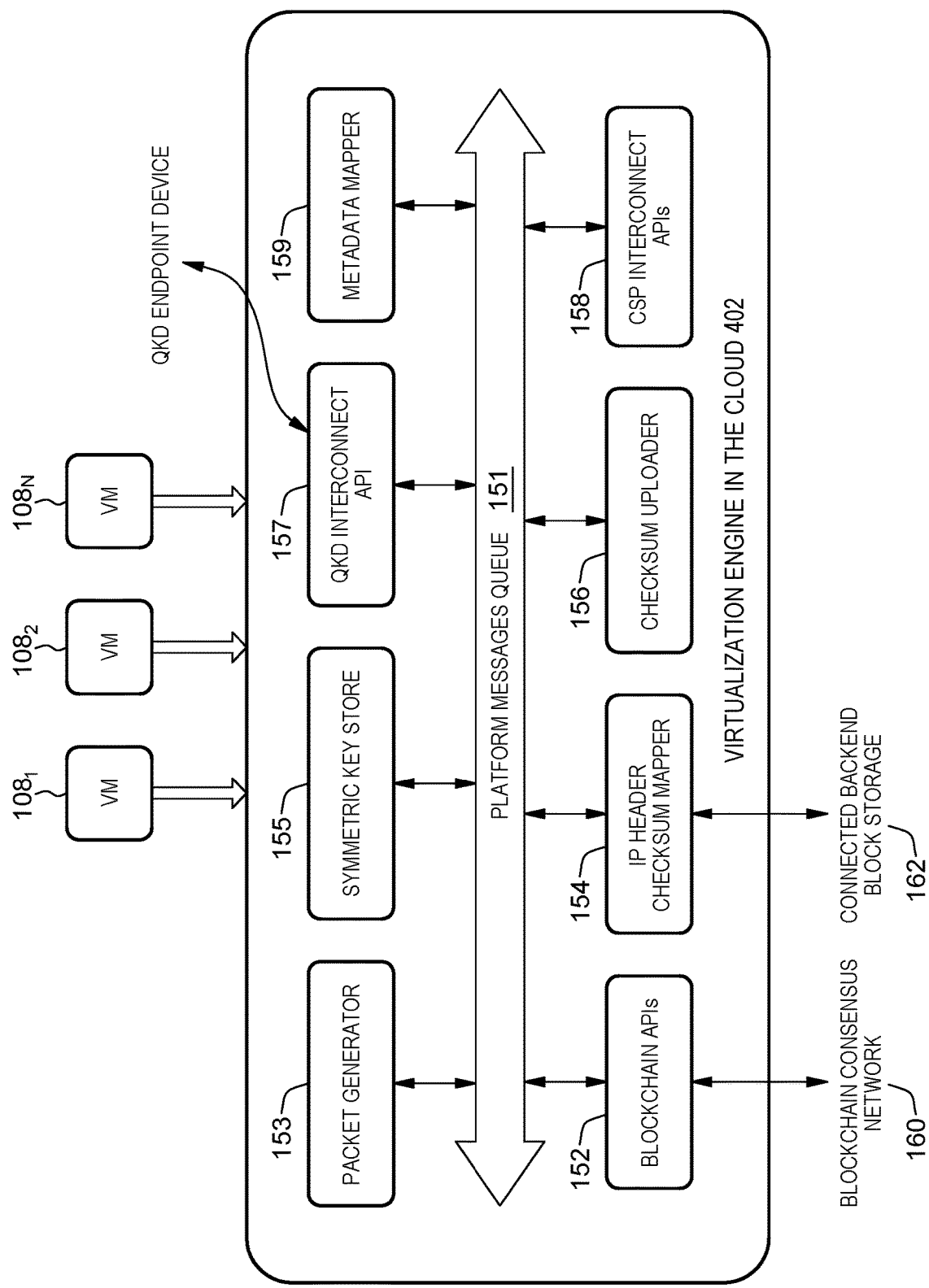
FIG. 4 illustrates a node architecture, on a server computer within the distributed data processing environment of FIG. 3, for detecting data corruption between storage systems, in accordance with an embodiment of the present invention.

FIG. 4 illustrates node architecture of node(s) 113 and node(s) 123, generally designated 400, in communication with computing device 101, computing device 102, server 110, server 120, and/or blockchain 144 within distributed data processing environment 300 of FIG. 3, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, virtualization engine in the cloud 402 represents a node (e.g., node(s) 113 and/or node(s) 123). In the depicted embodiment, virtual machines (VM) $108_{1-N}$, herein after VM(s) 108 contribute to the node. As used herein, N represents a positive integer, and accordingly the number of scenarios implemented in a given embodiment of the present invention is not limited to those depicted in FIG. 4. VM(s) 108 enable application deployment and issue block storage I/O request to a storage target system(s) (e.g., storage system 121). VM(s) 108 are virtual machines as they are known and understood in the art. In the depicted embodiment, the node comprises blockchain APIs 152, packet generator 153, IP header checksum mapper 154, symmetric key store 155, checksum uploader 156, QKD interconnect API 157, CSP interconnect APIs 158, and metadata mapper 159 communicating through platform mapper queue 151. In the depicted embodiment, Block APIs 152 communicates with and relays data to and from blockchain consensus network 160, wherein blockchain consensus network 160 comprises blockchain 144 and/or ledger state database 142. In various embodiments of the present invention, Blockchain APIs 152 enables data communication and storing to blockchain consensus network 160. In various embodiments of the present invention, symmetric key store 155 enables the storing of active and previously used generated keys, wherein key store 155 directs the storage of the symmetric keys on to blockchain consensus network and/or connected backend block storage 162. Further, in the depicted embodiment, IP header checksum mapper communicates with and relays data to and from connected backend block storage 162. Additionally, in the depicted embodiment, QKD interconnect API communicates with and relays data to and from QKD endpoint devices.

For example, node(s) 113 has various layers of I/O processing stack wherein one of the layers is replication, wherein the replication layer handles the requirements and processing of the I/O state machine to maintain the consistent copies of replication enabled volumes at the storage level. In one or more embodiments involving replication enabled storage systems, the replication enabled storage systems have at least two endpoint devices, one at each storage system. Node(s) 113 may typically comprises a packet generator (e.g., packet generator 153) that generates replication network packets at the source storage system and sends it over the network (e.g., network 130 or replication link 115) for WRITE replication purpose. In this example, a symmetric key generator creates the keys that are used for packet encryption before the replication network packet is sent over the network. In this example, when the target storage system collects the packet, the replication target system (i.e., target storage system) decodes the collected packet using the generated key and submits the packet to a target replication manager that manages and executes the next set of I/O completion operations.

Figure 5A:
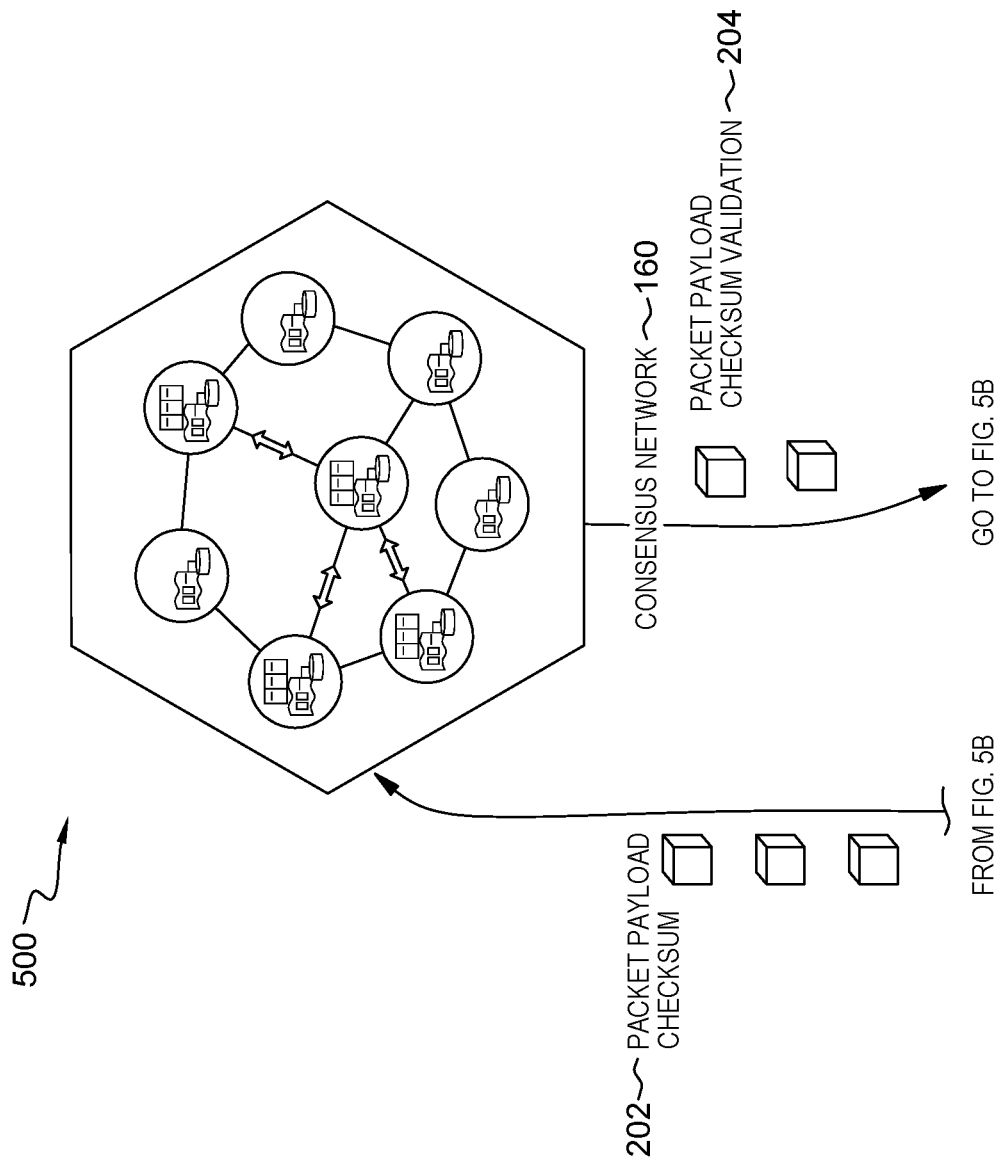
FIG. 5A-5B are functional block diagrams, on multiple server computers within the distributed data processing environment of FIG. 3, for detecting data corruption between storage systems, in accordance with an embodiment of the present invention.
Figure 5B:
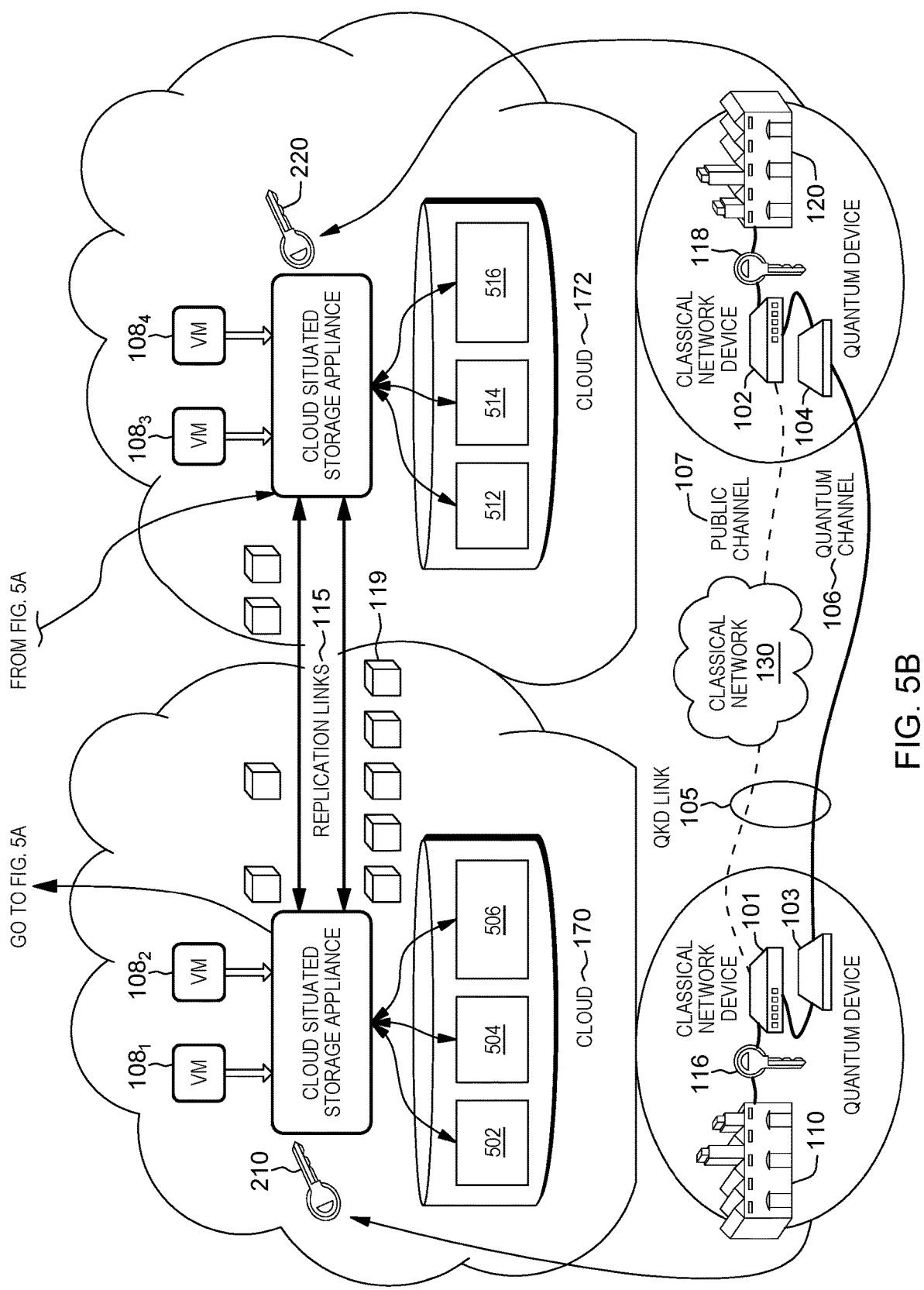

FIGS. 5A and 5B a functional block diagram illustrating a distributed data processing environment, generally designated 500, for detecting data corruption between storage systems in accordance with one embodiment of the present invention. The term "distributed" as used in this specification describes a computer system that includes multiple, physically distinct devices that operate together as a single computer system. FIGS. 5A and 5B provides an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, in the public cloud implementation of storage virtualization systems (e.g., storage systems 111, 121 and clouds 170 and 172), when replication is configured between the instances of the storage system (e.g., storage system 111 and/or storage system 121) for disaster recovery or high availability of block data, then the I/O traffic will be sent to replication link 115 across the storage controller engines within storage system 111 and storage system 121 within cloud 170 and cloud 172 respectively. QKD mechanism, via quantum device 103 and quantum device 104, may generate one or more secret keys at a source storage system and a target storage system (e.g., storage system 111 to storage system 121, respectively), wherein storage systems will use symmetric key encryption (e.g., key 210 and key 220) once the quantum keys (e.g., quantum key (QK) 116 and QK 118) are generated at the respective locations. In various embodiments of the present invention, when storage system 111 or storage system 121 decide to replicate the data from storage instance X to Y, then the QKD API are invoked. QKD API's (e.g., QKD interconnected API 157), depicted in FIG. 4, are responsible for retrieving the source and target's physical location in the cloud infrastructure and communicate with the QKD endpoint device (e.g., server 110, server 120, computing device 101, and/or computing device 101).

In various embodiments of the present invention, once the base location is identified for both storage system 111 and storage system 121, then the QKD mechanism is initiated which then generates a secure key at both of the endpoints (e.g., key 116 and key 118). In various embodiments of the present invention, once the secure key is generated, the replication block level IO traffic (traffic 119) will be sent via data encryption over replication link 115 and QKD link 105 between storage system 111 and storage system 121. In various embodiments of the present invention, component 122, not depicted in FIG. 5A and FIG. 5B, stores the received data, after decryption, on storage system 111 and/or storage system 121, via SSD 502, SSD 512, HDD 504, HDD 514, nearline storage 506, and/or nearline storage 516. In various embodiments of the present invention, the saving features are predetermined. In other embodiments, the saving features are customizable. In various embodiments of the present invention, due to the transport mode encryption on the block storage system, component 122 encrypts the payload using the key generated by QKD network (e.g., key 116 or key 118). In various embodiments of the present invention, as the routing and other IP packets are not encrypted, there are probabilities to change the payload and IP header maybe updated for corrupted values. To mitigate the corruption, component 122 may enable mechanisms to save the checksum data on blockchain 144 before sending the data packets over network 130 (e.g., sending IP packets through replication links 115 as traffic 119), wherein the mechanisms, via component 122, generate a checksum of the packet payload, embed the checksum into the packet and save the data into the ledger for target system reading purposes.

Checksums comprise little to no data and typically comprise a few bytes per packet, thus it is beneficial to save the IP packet checksum as part of Blockchain payload. Once the data packets reach to the destination, the IP headers are extracted, and the checksum values are matched with the values submitted to blockchain ledger (e.g., blockchain 144). In various embodiments of the present invention, if malicious activity is detected or occurs within the IP packet, then the blockchain payload checksum and IP packet checksum will not match and data corruption will be detected. If the checksum matches the IP header and Blockchain payload, then the data will be decrypted, and further processing is performed on the data.

Component 122 may select blockchain enabled payload validation for symmetric QKD encryption mechanism deployed as a service model. In various embodiments of the present invention, certain objects, or set of inherited objects sets are subscribed for enhanced security mechanism in for Transport mode encryption. In one embodiment, selected replication I/O's that belong to a subscribed set of the services and are using Transport mode are tagged to save the checksum values to blockchain payload. This service model will enable configuration-based decision-making capability to the storage systems (e.g., system 111 and storage system 121) installed in the cloud (e.g., cloud 170 and/or cloud 172) for additional security in combination with the QKD mechanisms. Further, in various embodiments of the present invention, if frequent checksum mismatches trigger security breach isolation demanding corrective actions then component 122 validates blockchain payload corruption, wherein validation comprises component 122 requesting the checksum over the ledger for the applications component 122 is enabled to access and/or execute and performs checksum matching in header and the ledger. The packet is dropped in case discrepancy found.

In various embodiments of the present invention, communication between cloud storage engine instances is performed by either using separate out-of-band protocol or reserved fields in the write CDB (SCSI CDB). In some embodiments, both out-of-band protocol and reserved fields capabilities are layers within the same storage controller and pass information across layers.

In various embodiments of the present invention, the SCSI Command Descriptor Block (CDB) mechanism maybe used to implement in-bound or out-of-bound APIs for communication across the modules of the proposed system wherein CDB are used to exchange the commands across the components which are usually comprised of 6, 10, 12, or 16 bytes based on SCSI standards. However, communication methodology may get vary based on the implementation design aspects of with consideration of appliance environment.

Figure 6:
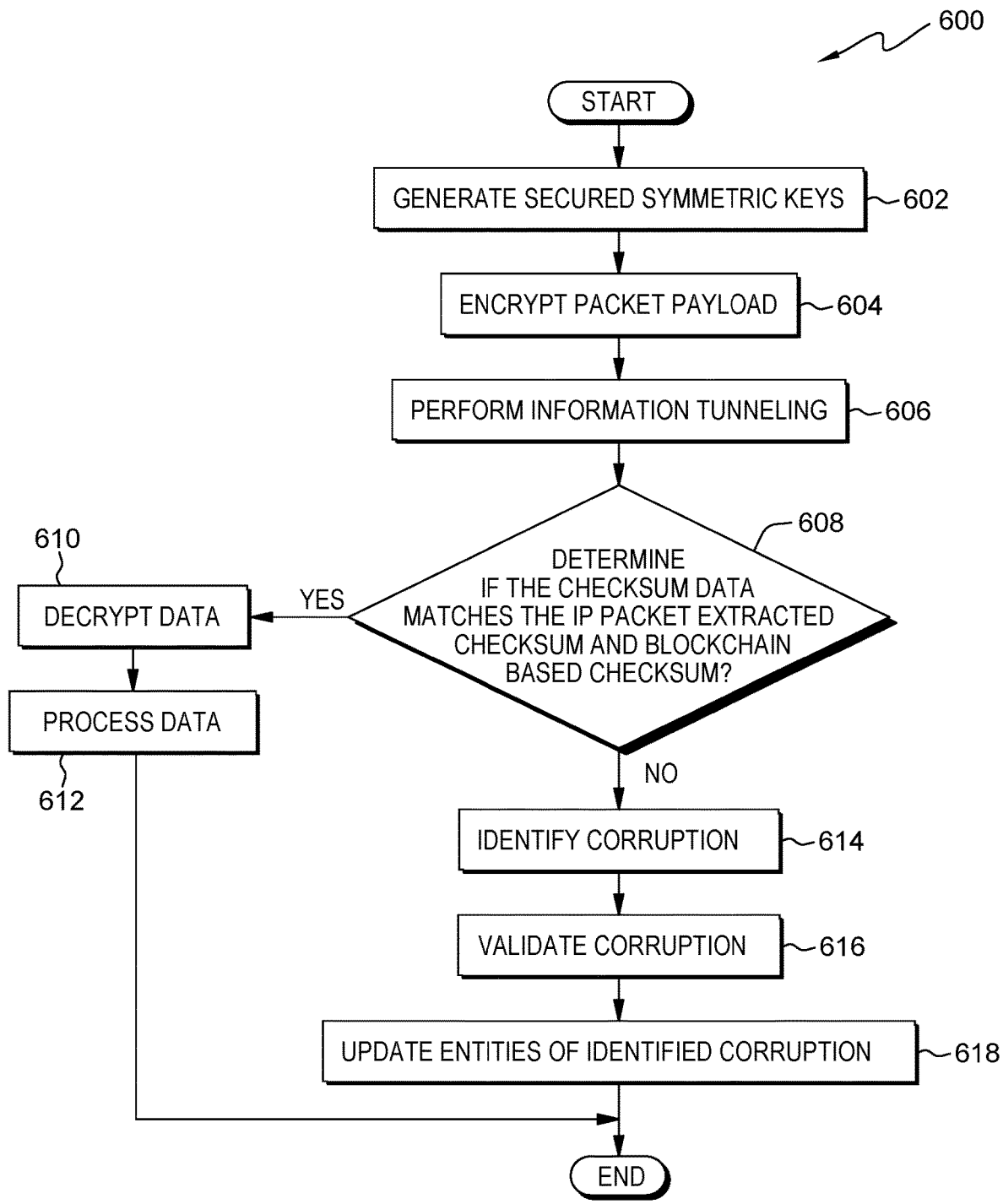
FIG. 6 illustrates operational steps of a data corruption detection component, on the server computer within the distributed data processing environment of FIG. 3, for detecting data corruption between storage systems, in accordance with an embodiment of the present invention.

FIG. 6 illustrates operational steps of component 122, generally designated 600, in communication with server 110 and 120, within distributed data processing environment 300 of FIG. 3, for detecting data corruption between storage systems, in accordance with an embodiment of the present invention. FIG. 6 provides an illustration of one implementation and does not imply any limitations with regard to the environments in which different embodiments may be implemented. Many modifications to the depicted environment may be made by those skilled in the art without departing from the scope of the invention as recited by the claims.

In step 602, component 122 generates secure symmetric keys. In various embodiments of the present invention, component 122 generates secure symmetric keys between the source and target system using QKD which may be used for in-flight data replication. For example, storage system 111 (the source system) received instructions to send data to storage system 121 (the target system). In this example, component 122 generates secure symmetric keys between storage system 111 and storage system 121 to secure the data transaction between storage system 111 and storage system 121. In various embodiments of the present invention, component 122 discovers the physical location of the storage instances in the cloud (e.g., cloud 170 and/or cloud 172), collects information from the underlying layer of the received quantum keys (e.g., quantum key 116 and quantum key 118) and saves, maintains and encrypts the data using the collected quantum keys.

In step 604, component 122 component 122 encrypts one or more packet payloads. In various embodiments of the present invention, component 122 encrypts one or more packet payloads in Ethernet packet frames and keeps the routing intact for efficient path traversing of the block data across the cloud 170 and cloud 172. Component 122 may calculate the checksum of the data payload for the internet protocol (IP) packets and requests submission to Blockchain ledger (e.g., blockchain 144) along with the IP packet ser_no and checksum. In various embodiments of the present invention, component 122 saves the checksum data as payload on blockchain 144, via ledger state database 142, wherein the saved checksum maybe requested by the target system.

In step 606, component 122 perform information tunneling on data transferring between storage systems. In various embodiments of the present invention, component 122 may perform information tunneling on data transferring between storage system 111 and storage system 121 using the enabled communication described above, accordingly. In various embodiments of the present invention, component 122 provides in-bound or out-of-bound API infrastructure to communicate between the QKD device (e.g., quantum device 103 and quantum device 104) and block storage instances in the cloud based on the physical device identification.

In step 608, component 122 determines if the checksum data matches the IP packet extracted checksum and blockchain based checksum. In various embodiments of the present invention, component 122 sends the data to the target location over cloud infrastructure network (e.g., replication links 115) using Quantum key transport mode encrypted packets. Component 122 determines if the checksum data matches the stored IP packet extracted checksum and blockchain based checksum by comparing the checksum data at the target system with the IP packet extracted checksum and blockchain based checksum. If the component 122 determines that the checksum data matches IP packet extracted checksum and blockchain based checksum (Yes step) then component 122 advances to step 616. However, if component 122 determines the checksum data does not match the IP packet extracted checksum and blockchain based checksum (No step) then component 122 advances to step 610. In various embodiments of the present invention, if component 122 determines the checksum data does not match the IP packet extracted checksum and blockchain based checksum component 122 issues a data SEND_FAILURE and retransmission is initiated as original data is corrupted.

In step 610, component 122 decrypts the data payload. In various embodiments of the present invention, component 122 if the checksum matches then component 122 decrypts the data payload.

In step 612, component 122 processes the decrypted data. In various embodiments of the present invention, component 122 processes the decrypted data payload.

In step 614, component 122 identifies corruption in the data payload. In various embodiments of the present invention, component 122 detects and identifies the corruption level of the data in the data payload based on the comparison outlined in step 608 and updates the respective entities of the detected and identified data accordingly.

In step 616, component 122 validates the identified corruption. In various embodiments of the present invention, if frequent checksum mismatches trigger security breach isolation demanding corrective actions then component 122 validates blockchain payload corruption. Frequent checksum mismatch triggers may be a predetermined number or a customizable number. In various embodiments of the present invention, component 122 selects blockchain enabled payload validation for symmetric QKD encryption mechanism deployed as a service model. In various embodiments of the present invention, component 122 enables secured replication over cloud 170 and/or cloud 172 and enables configuration parsing.

In step 618, component 122 updates respective entities of the detected and identified data. In various embodiments of the present invention, component 122 updates respective entities of the detected and identified data.

Figure 7:
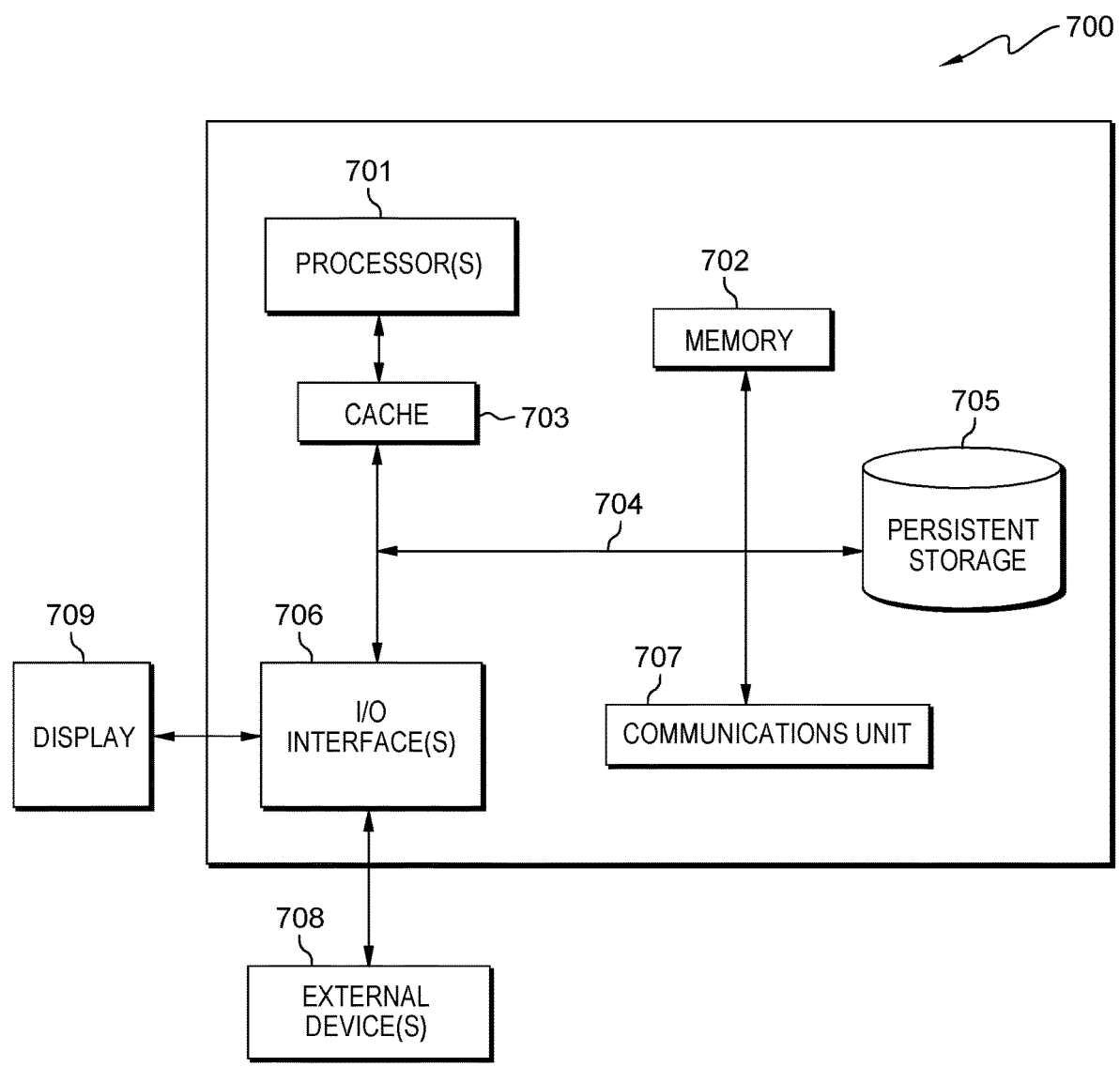
FIG. 7 depicts a block diagram of components of the server computer executing the automated feedback and continuous learning component within the distributed data processing environment of FIG. 3, in accordance with an embodiment of the present invention.

FIG. 7 depicts a block diagram of components of server 110 and/or 120 within distributed data processing environment 300 of FIG. 3, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

FIG. 7 depicts computer system 700, where server 110 and/or server 120 represents an example of computer system 700 that includes component 122. The computer system includes processors 701, cache 703, memory 702, persistent storage 705, communications unit 707, input/output (I/O) interface(s) 706, display 709, external device(s) 708 and communications fabric 704. Communications fabric 704 provides communications between cache 703, memory 702, persistent storage 705, communications unit 707, and input/output (I/O) interface(s) 706. Communications fabric 704 may be implemented with any architecture designed for passing data and/or control information between processors (such as microprocessors, communications, and network processors, etc.), system memory, peripheral devices, and any other hardware components within a system. For example, communications fabric 704 may be implemented with one or more buses or a crossbar switch.

Memory 702 and persistent storage 705 are computer readable storage media. In this embodiment, memory 702 includes random access memory (RAM). In general, memory 702 may include any suitable volatile or non-volatile computer readable storage media. Cache 703 is a fast memory that enhances the performance of processors 701 by holding recently accessed data, and data near recently accessed data, from memory 702.

Program instructions and data used to practice embodiments of the present invention may be stored in persistent storage 705 and in memory 702 for execution by one or more of the respective processors 701 via cache 703. In an embodiment, persistent storage 705 includes a magnetic hard disk drive. Alternatively, or in addition to a magnetic hard disk drive, persistent storage 705 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data used to practice embodiments of the present invention may be downloaded to persistent storage 705 through communications unit 707.

I/O interface(s) 706 enables for input and output of data with other devices that may be connected to each computer system. For example, I/O interface 706 may provide a connection to external devices 708 such as a keyboard, keypad, a touch screen, and/or some other suitable input device. External devices 708 may also include portable computer readable storage media such as, for example, thumb drives, portable optical or magnetic disks, and memory cards. Software and data used to practice embodiments of the present invention may be stored on such portable computer readable storage media and may be loaded onto persistent storage 705 via I/O interface(s) 706. PO interface(s) 706 also connect to display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for detecting data corruption between storage systems, the method comprising:
    performing information tunneling on data transferring between a source storage system and a target storage system;
    calculating a checksum of a data payload for an Internet Protocol (IP) packet and requesting submission to a blockchain ledger along with an IP packet serial number and the checksum;
    determining the checksum data of the data payload of the data transferring does not match the IP packet checksum and a blockchain based checksum, wherein determining comprises:
    comparing the checksum data at the target storage system against the IP packet extracted checksum and the blockchain based checksum to identify one or more checksum mismatches between the checksum data at the target storage system and at least one of the IP packet extracted checksum and the blockchain based checksum;
    identifying a corruption in the data payload of the data transferring based on the comparison between the checksum data at the target storage system and the IP packet extracted checksum and the blockchain based checksum;
    responsive to receiving a predetermined number of checksum mismatches that trigger a security breach isolation demanding corrective actions, validating the corruption in the data payload of the data transferring; and
    updating respective entities of identified corruption in the data payload of the data transferring.

2. The computer-implemented method of claim 1, further comprising:
    generating one or more secured symmetric keys between the source storage system and the target storage system using a quantum key distribution;
    discovering a physical location of one or more storage instances in the source storage system or the target storage system;
    collecting information from an underlying layer for one or more symmetric keys;
    encrypting the data payload of the data transferring using one or more collected quantum keys; and
    saving the data payload of the data transferring using the one or more collected quantum keys.

3. The computer-implemented method of claim 1, further comprising:
    encrypting a packet payload in one or more Ethernet packet frames and keeping routing intact for efficient path traversing of block data across the source storage system and the target storage system; and
    saving the checksum data of the data payload for the IP packets as payload in the blockchain ledger that is requested at the target storage system, wherein the checksum data of the data payload for the IP packets is requested at the target system.

4. The computer-implemented method of claim 1, further comprising:
    providing an in-bound or out-of-bound API infrastructure to communicate between a Quantum Key Distribution device and block storage instances in the source storage system or the target storage system based on a physical device identification.

5. The computer-implemented method of claim 1, further comprising:
    sending the checksum data of the data payload of the data transferring to the target storage system over a cloud infrastructure network using one the more quantum key transport mode encrypted packets and comparing the checksum data at the target storage system among the IP packet extracted checksum and blockchain based checksum.

6. The computer-implemented method of claim 1, further comprises:
    issuing a data SEND_FAILURE and retransmission is initiated if original data is corrupted.

7. The computer-implemented method of claim 1, further comprising:
    sending the checksum data over a blockchain ledger for one or more designated objects, one or more set of objects or one or more inherited objects
    traversing to improve selection quality of service data replication.

8. A computer system for detecting data corruption between storage systems, the computer system comprising:
    one or more computer processors;
    one or more computer readable storage devices;
        program instructions stored on the one or more computer readable storage devices for execution by at least one of the one or more computer processors, the stored program instructions comprising:
        program instructions to perform information tunneling on data transferring between a source storage system and a target storage system;
        program instructions to calculate a checksum of a data payload for an Internet Protocol (IP) packet and requesting submission to a blockchain ledger along with an IP packet serial number and the checksum;
        program instructions to determine the checksum data of the data payload of the data transferring does not match the IP packet checksum and a blockchain based checksum, wherein determining comprises:

program instructions to compare the checksum data at the target storage system against the IP packet extracted checksum and the blockchain based checksum to identify one or more checksum mismatches between the checksum data at the target storage system and at least one of the IP packet extracted checksum and the blockchain based checksum;

program instructions to identify a corruption in the data payload of the data transferring based on the comparison between the checksum data at the target storage system and the IP packet extracted checksum and the blockchain based checksum;

responsive to receiving a predetermined number of checksum mismatches that trigger a security breach isolation demanding corrective actions, program instructions to validate the corruption in the data payload of the data transferring; and program instructions to update respective entities of identified corruption in the data payload of the data transferring.

9. The computer system of claim 8, further comprising:
program instructions to generate one or more secured symmetric keys between the source storage system and the target storage system using a quantum key distribution;

program instructions to discover a physical location of one or more storage instances in the source storage system or the target storage system;

program instructions to collect information from an underlying layer for one or more symmetric keys;

program instructions to encrypt the data payload of the data transferring using one or more collected quantum keys; and program instructions to save the data payload of the data transferring using the one or more collected quantum keys.

10. The computer system of claim 8, further comprising:
program instructions to encrypt a packet payload in one or more Ethernet packet frames and keeping routing intact for efficient path traversing of block data across the source storage system and the target storage system; and program instructions to save the checksum data of the data payload for the IP packets as payload in the blockchain ledger that is requested at the target storage system, wherein the checksum data of the data payload for the IP packets is requested at the target system.

11. The computer system of claim 8, further comprising:
program instructions to provide an in-bound or out-of-bound API infrastructure to communicate between a Quantum Key Distribution device and block storage instances in the source storage system or the target storage system based on a physical device identification.

12. The computer system of claim 8, further comprising:
program instructions to the checksum data of the data payload of the data transferring to the target storage system over a cloud infrastructure network using one the more quantum key transport mode encrypted packets and comparing the checksum data at the target storage system among the IP packet extracted checksum and blockchain based checksum.

13. The computer system of claim 8, further comprises:
program instructions to issue a data SEND_FAILURE and retransmission is initiated if original data is corrupted.

14. The computer system of claim 8, further comprising:
program instructions to send the checksum data over a blockchain ledger for one or more designated objects, one or more set of objects or one or more inherited objects traversing to improve selection quality of service data replication.

15. A computer program product for detecting data corruption between storage systems, the computer program product comprising:
one or more computer readable storage devices and program instructions stored on the one or more computer readable storage devices, the stored program instructions comprising:

program instructions to perform information tunneling on data transferring between a source storage system and a target storage system;

program instructions to calculate a checksum of a data payload for an Internet Protocol (IP) packet and requesting submission to a blockchain ledger along with an IP packet serial number and the checksum;

program instructions to determine the checksum data of the data payload of the data transferring does not match the IP packet checksum and a blockchain based checksum, wherein determining comprises:

program instructions to compare the checksum data at the target storage system against the IP packet extracted checksum and the blockchain based checksum to identify one or more checksum mismatches between the checksum data at the target storage system and at least one of the IP packet extracted checksum and the blockchain based checksum;

program instructions to identify a corruption in the data payload of the data transferring based on the comparison between the checksum data at the target storage system and the IP packet extracted checksum and the blockchain based checksum;

responsive to receiving a predetermined number of checksum mismatches that trigger a security breach isolation demanding corrective actions, program instructions to validate the corruption in the data payload of the data transferring; and program instructions to update respective entities of identified corruption in the data payload of the data transferring.

16. The computer program product of claim 15, further comprising:
program instructions to generate one or more secured symmetric keys between the source storage system and the target storage system using a quantum key distribution;

program instructions to discover a physical location of one or more storage instances in the source storage system or the target storage system;

program instructions to collect information from an underlying layer for one or more symmetric keys;

program instructions to encrypt the data payload of the data transferring using one or more collected quantum keys; and program instructions to save the data payload of the data transferring using the one or more collected quantum keys.

17. The computer program product of claim 15, further comprising:
program instructions to encrypt a packet payload in one or more Ethernet packet frames and keeping routing intact for efficient path traversing of block data across the source storage system and the target storage system; and program instructions to save the checksum data as payload in the blockchain ledger that is requested at the target storage system, wherein the checksum data is requested at the target system.

18. The computer program product of claim 15, further comprising:

program instructions to provide an in-bound or out-of-bound API infrastructure to communicate between a Quantum Key Distribution device and block storage instances in the source storage system or the target storage system based on a physical device identification.

19. The computer program product of claim 15, further comprising:

program instructions to send the checksum data of the data payload of the data transferring to the target storage system over a cloud infrastructure network using one the more quantum key transport mode encrypted packets and comparing the checksum data at the target storage system among the IP packet extracted checksum and blockchain based checksum.

20. The computer program product of claim 15, further comprising:

program instructions to send the checksum data over a blockchain ledger for one or more designated objects, one or more set of objects or one or more inherited objects traversing to improve selection quality of service data replication.

* * * * *